Feb. 26, 1924.
J. B. DYE
1,485,257
ICE PICK
Filed Nov. 22, 1921
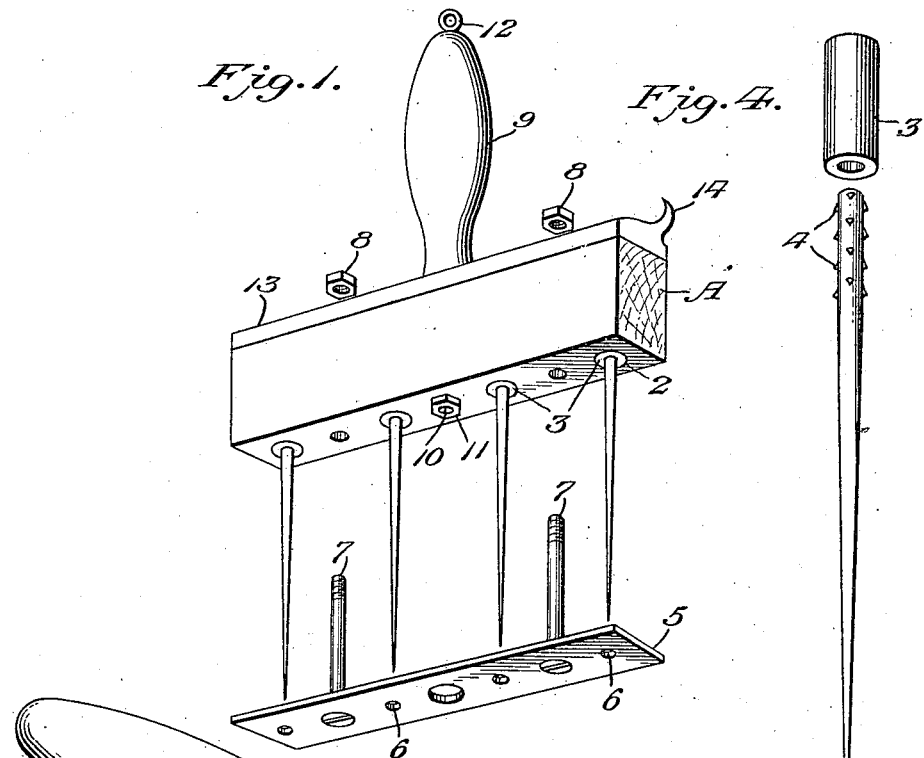

Patented Feb. 26, 1924.

1,485,257

UNITED STATES PATENT OFFICE.

JOHN B. DYE, OF SPRINGFIELD, MISSOURI.

ICE PICK.

Application filed November 22, 1921. Serial No. 516,985.

*To all whom it may concern:*

Be it known that I, JOHN B. DYE, of Springfield, county of Greene and State of Missouri, and a citizen of the United States, have invented certain new and useful Improvements in Ice Picks, of which the following is a specification.

My invention relates to an improvement in ice picks.

The object is to provide a device of the character named for what may be termed "light work," for instance, domestic purposes.

This invention consists of a plurality of steel picks set in rubber in a suitable head and having one or more handles by which to manipulate it. The object of the rubber is to afford flexibility so that the pick will give at the base or point of attachment without breaking.

In the accompanying drawings, Figs. 1 and 2 are views of different forms of picks embodying this idea.

Figure 3 is a view showing a pick having two handles.

Figure 4 is a detail showing one of the steel picks and a rubber sleeve for holding it in position.

Referring to Fig. 1, A represents a block, preferably of wood, forming the head in which the steel picks (one of which is shown in Fig. 4) are held. Sockets 2 are formed by boring into the edge of the head A and the picks are set in rubber sleeves 3. These sleeves are made of soft rubber to constitute a pliable base for the picks and to afford them flexibility. In these holes or sockets and to insure holding them securely in place the shank of the pick is provided with barbs 4 which hold the picks securely in the rubber and after being placed therein a metal plate 5, having holes 6 therein, is threaded on the picks bolted securely to the lower edge of the head A by means of bolts 7 held in place by nuts 8. The handle 9 is also held in place by bolt 10 and nut 11 and the same preferably has an eyelet 12 at the outer end as a convenient means for hanging the pick when not in use.

A metal plate 13 may be bolted at the outer edge to give strength and weight to the tool and one end of this is preferably in the form of a marker 14 as shown in Fig. 1.

When the plate 5 is bolted in place it holds the rubber sleeves in their sockets and the picks are held in the rubber sleeves by the barbs 4 and the diameter through the barbs is greater than the diameter of the hole 6 so that when the plate 5 is bolted in place the picks can not pull out but they are flexibly held so that they give under pressure and strain slightly without breaking.

In the form shown in Fig. 2 the head is made in two parts 15 and 16 clamping around the sides of sleeves 3 and they are held together by bolts 17. The picks 1 are held in the sleeves 3 in the same way by the barbs 4 and the sleeves 3 are sunk in the sockets 18 of greater size than the holes 19 for the picks so that the sleeves can not be pulled out and the picks will not pull out without the sleeves.

A facing of rubber 20 may be placed over the outer surface of the head.

In form shown in Fig. 3 the pick is the same as shown in Fig. 2 except that it is longer and has two handles 9'. In this way I have produced a very simple little device which does not easily get out of order and is effective in breaking off a piece of ice straight across the chunk.

I claim:

1. An ice pick including a head having sockets therein, rubber sleeves within said sockets, metal picks having one end secured within the sleeves, said rubber sleeves forming a pliable base for the metal picks, and a plate at the outer end of the sockets for covering the sleeves and preventing them from being pulled out with the picks.

2. An ice pick including a head having sockets therein, rubber sleeves within said sockets, metal picks having one end secured within the sleeves, said rubber sleeves forming a pliable base for the metal picks, a metal plate at the outer end of the sockets, bolts for securing said plate to the head, a second metal plate secured to the head and a handle secured to the head.

In testimony whereof I hereunto affix my signature.

JOHN B. DYE.